United States Patent
Löfgren et al.

(10) Patent No.: US 6,368,686 B1
(45) Date of Patent: Apr. 9, 2002

(54) LAMINATED PACKING MATERIAL WITH GOOD GAS AND AROMA BARRIER PROPERTIES, AND METHOD FOR THE MANUFACTURE OF THE MATERIAL

(75) Inventors: Lars Löfgren, Staffanstorp; Peter Frisk, Malmö, both of (SE)

(73) Assignee: Tetra Laval Holdings & Finance S.A., Pully (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/200,572

(22) Filed: Feb. 22, 1994

Related U.S. Application Data

(63) Continuation of application No. 07/873,611, filed on Apr. 22, 1992, now abandoned, which is a continuation of application No. 07/458,231, filed on Dec. 28, 1989, now abandoned.

(30) Foreign Application Priority Data

Jan. 11, 1989 (SE) ................................. 8900082

(51) Int. Cl.$^7$ ............................ B32B 1/08; B27N 1/08; B29D 22/00
(52) U.S. Cl. .................... 428/34.2; 428/34.5; 428/34.7; 428/36.6; 428/36.7; 428/336; 428/449; 428/451; 428/452; 428/511; 229/123.2; 229/125.42
(58) Field of Search ................ 428/36.7, 36.6, 428/336, 34.2, 34.5, 34.7, 449, 451, 452, 511; 229/123.2, 125.42

(56) References Cited

U.S. PATENT DOCUMENTS

| | | | | |
|---|---|---|---|---|
| 3,442,686 A | * | 5/1969 | Jones | 428/336 |
| 3,740,306 A | | 6/1973 | Kosbab et al. | 428/349 |
| 3,808,027 A | * | 4/1974 | Anderson et al. | 428/332 |
| 3,813,315 A | | 5/1974 | Valyi | 156/254 |
| 4,552,791 A | * | 11/1985 | Hahn | 428/35 |
| 4,695,510 A | * | 9/1987 | Sawamura et al. | 428/336 |
| 4,775,096 A | * | 10/1988 | Andersson et al. | 229/125.42 |
| 4,792,488 A | | 12/1988 | Schirmer | 428/349 |
| 4,801,078 A | * | 1/1989 | Carlsson | 229/123.2 |
| 4,811,849 A | * | 3/1989 | Rausing | 229/214 |
| 5,122,410 A | * | 6/1992 | Lufgren et al. | 428/216 |

FOREIGN PATENT DOCUMENTS

| | | | |
|---|---|---|---|
| EP | A30209362 | 1/1987 | |
| EP | A10240571 | 10/1987 | |
| GB | 2103999 | * 3/1983 | |
| JP | 60-203431 | 10/1985 | |
| JP | 1988-88938 | 6/1988 | |
| JP | 1286842 A | * 11/1989 | 428/36.7 |

* cited by examiner

Primary Examiner—Leszek Kiliman
(74) Attorney, Agent, or Firm—Burns, Doane, Swecker & Mathis, L.L.P.

(57) ABSTRACT

A laminated material for the manufacture of packing containers with good gas and aroma barrier properties, and a method for the manufacture of the laminated material.

The laminated material has a base layer (18) and a barrier layer (19) of inorganic material of a thickness of only 50–500 Å serving as a gas and aroma barrier. The barrier layer (19) is applied to the base layer (18) by means of vacuum deposition and bonded to the base layer by means of at least one intermediate layer (22) of bonding agent. To facilitate the conversion of the material to packing containers the barrier layer (19) is omitted along such areas (17*a* and 17*b*) of the material which are intended to be folded against, and combined with, one another by heat-sealing during the manufacture of the said containers.

26 Claims, 4 Drawing Sheets

LAMINATED PACKING MATERIAL WITH GOOD GAS AND AROMA BARRIER PROPERTIES, AND METHOD FOR THE MANUFACTURE OF THE MATERIAL

This application is a continuation of U.S. application No. 07/873,611, filed on Apr. 22, 1992, now abandoned, which was a continuation of application No. 07/458,231, filed Dec. 28, 1989, now abandoned.

FIELD OF THE INVENTION

The present invention relates to a laminated material for the manufacture of packing containers with good gas and aroma barrier properties, such a material comprising a base layer and a barrier layer serving as a gas and aroma barrier. The invention also relates to a method for the manufacture of the laminated material.

BACKGROUND OF THE INVENTION

In packing technology consumer packages of non-returnable character have been used for a long time for the packaging and transporting of liquid foodstuffs. The material in these so-called non-returnable or one-way packages usually consists of several material layers laminated to one another whose number and composition may vary so as to provide the package in each individual case with the required mechanical and other protective properties required for the particular foodstuff. A conventional non-returnable package for milk usually is manufactured from a packing material comprising a base layer consisting of paper or cardboard which furnishes the package with the necessary mechanical strength characteristics, and one or more outer coatings of thermoplastics, e.g. polythene, which on the one hand renders the package liquid-tight and on the other hand makes it possible for the package to be made permanent in its intended final geometric shape by means of so-called heat-sealing which consists in surface-fusing of the plastic coatings facing one another by means of heat and pressure so as to form liquid-tight, mechanically strong sealing joints during the manufacture of the packages. However, this packing material lacks tightness properties in respect of gases as the same time as it is pervious for, or has insufficient tightness properties towards, certain types of aroma substances, and is unsuitable, therefore, as packing material in packages intended for oxygen gas sensitive foodstuffs, e.g. juice which requires packages with good gas and aroma barrier properties. To furnish the packages with the necessary tightness properties towards gases and aroma substances the material in these packages is provided, therefore, with at least one further layer of a material with good gas and aroma barrier properties, usually a metal foil (Al foil) applied to the inside of the base layer which in addition to providing the packages with the necessary tightness properties also makes the material inductively heatable and thus allows an effective heat sealing by means of induction heating. It is a serious disadvantage of this known packing material, though, that an Al foil, because of its low extensibility, easily breaks or cracks along particularly exposed regions or so-called crosses during the conversion of the material to packages where the strains may become so great that thermoplastic coatings included in the material also rupture and so bring about seriously impaired tightness properties of the finished package.

It is also known to provide packing material with a barrier layer serving as a gas and aroma barrier of a polymer material, e.g. ethylene-vinyl alcohol copolymer (EVOH), but these barrier layers as a rule are moisture-sensitive and rapidly lose their tightness properties if they are exposed to moisture.

OBJECTS AND SUMMARY OF THE INVENTION

It is an object of the present invention, therefore, to provide directions regarding a new material for the manufacture of packing containers with good gas and aroma barrier properties without, or with appreciably reduced, risks of crack formation and lost barrier properties during the conversion of the material to packing containers associated therewith.

It is a further object to provide a packing material free from moisture-sensitive gas and aroma barrier layers.

It is a further object to provide directions regarding a packing material which in addition to good gas and aroma barrier properties is also pervious to microwave radiation and thus can be used for the manufacture of microwave-heatable packing containers.

These objects are achieved in accordance with the present invention in that a laminated material of the type described in the introduction has been given the characteristic that the barrier layer serving as gas and aroma barrier consists of inorganic material and is of a thickness of only 50–500 Ångström (Å).

Quite surprisingly it has been found, in fact, that the inorganic material layer, which preferably consists of a silicon compound, e.g. silicon dioxide ($SiO_2$) or silicon nitride ($Si_3N_4$), in spite of its small material thickness possesses extraordinarily good gas and aroma barrier properties at the same time as, thanks to the small material thickness, it is sufficiently flexible and extensible to make possible a conversion of the material to packing containers without any danger of cracking or breaking even in the most exposed material regions. A further advantage which is obtained by the preferred barrier layer mentioned here is that it is practically completely inert and thus neither affects nor is affected by the particular contents in the finished package.

Further objects of the present invention, moreover, have been given the characteristics which are evident from the subsidiary claims.

BRIEF DESCRIPTION OF THE DRAWING

In the following the invention will be described in detail with special reference to the attached drawings, wherein.

DETAILED DESCRIPTION OF PREFERRED EMBODIMENTS

Figure 1:
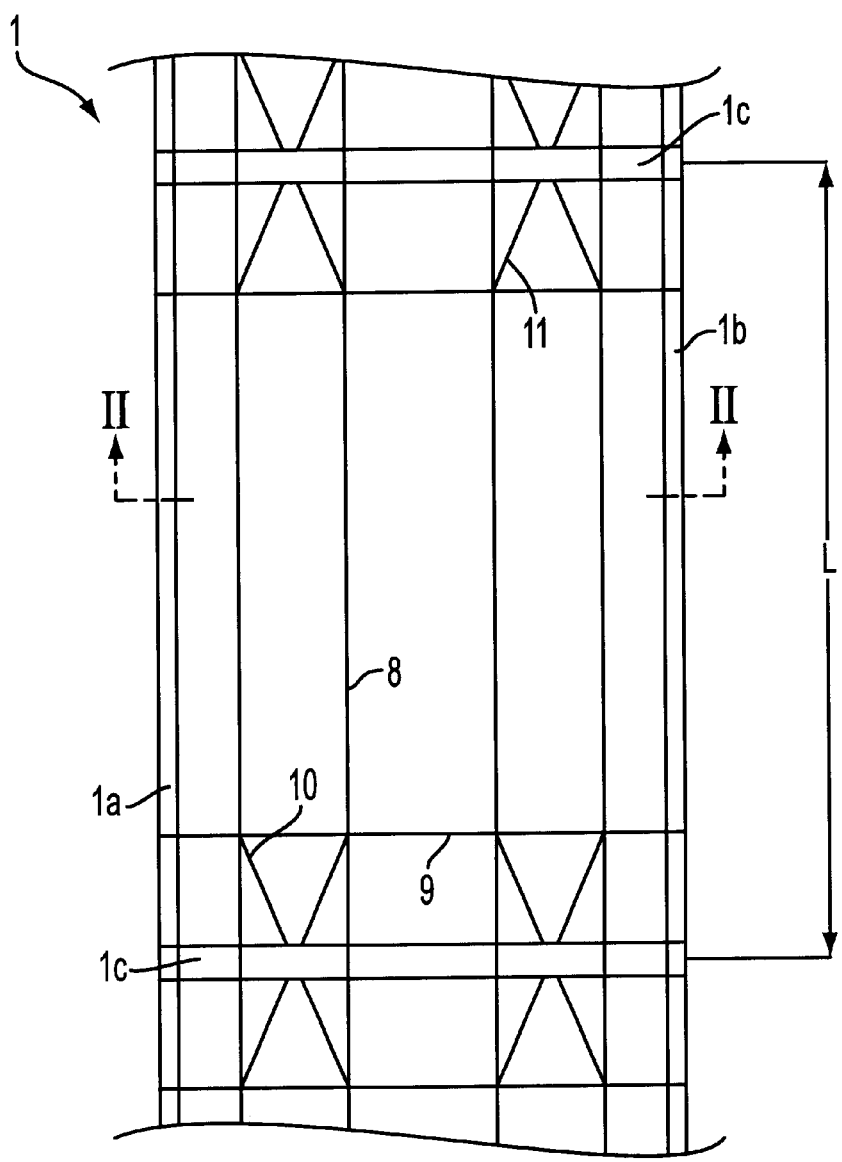
FIG. 1 shows schematically a portion of a weblike, laminated material in accordance with a first embodiment of the invention.

FIG. 1 thus shows schematically a portion corresponding to a package length L of a weblike, laminated material 1 in accordance with a first embodiment of the invention for conversion to packages with good gas and aroma barrier properties.

Figure 2:
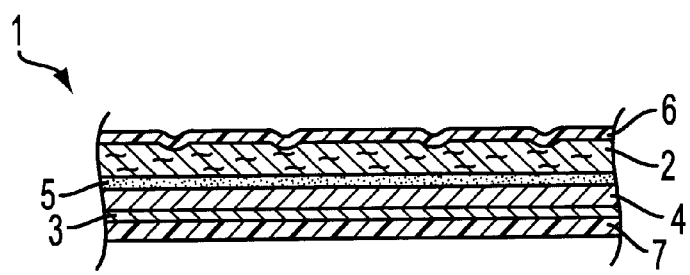
FIG. 2 is a cross-section along the line II—II in FIG. 1.

As is evident from FIG. 2, the material 1 comprises a stiffness layer 2 consisting of paper or cardboard against one side of which is applied a barrier layer 3 of inorganic material serving as a gas and aroma barrier. The barrier layer 3 which may consist of, for example, silicon dioxide ($SiO_2$) or silicon nitride ($Si_3N_4$) possesses a material thickness of between 50 and 500, preferably 200 Å and is constituted of a film of the required material thickness applied by vacuum deposition to a polymer carrier 4, e.g. polyester. The polymer carrier 4 supporting the barrier film is bonded to the base layer 2 by means of an intermediate bonding agent layer 5 of the polyethylene type (e.g., BYNEL™) or some other suitable bonding agent with good adhesion to the base layer 2 as well as to the carrier polymer 4. To protect the base layer 2 against the effect of external moisture the other side of the base layer 2 is covered with a thin coating 6 of thermoplastics, e.g. polythene and, moreover, as in the example shown, the inorganic barrier layer 3 can also be provided with an outer coating 7 of thermoplastics, e.g. polythene. In this manner an effective heat-sealing is made possible of overlap joints formed by folding over of the material 1 along which the coatings 6 and 7 folded and pressed against one another are combined lastingly by means of surface-fusing.

To facilitate the conversion of the weblike material 1 to packing containers the material can be provided with an arbitrary pattern of crease lines 8–10, facilitating the fold forming of the material, which run parallel with, perpendicularly to and across the longitudinal direction of the material.

From the weblike material 1 provided with crease lines finished packages are produced in that the two longitudinal edge zones 1a and 1b first are combined with one another in an overlap joint to form a tube. The tube is filled with the particular contents and is divided into individual packing units by means of repeated flattening and sealing off along zones 1c at right angles to the longitudinal direction of the tube. Thereafter the package units are separated from one another by means of cuts in the transverse sealing zones 1c and are given the desired final geometric shape, usually a parallelepiped, with the help of a further forming and sealing operation during which the double-walled corner lugs of the cushionlike package units are folded in against, and are sealed to, the outside of the packages.

Figure 6:
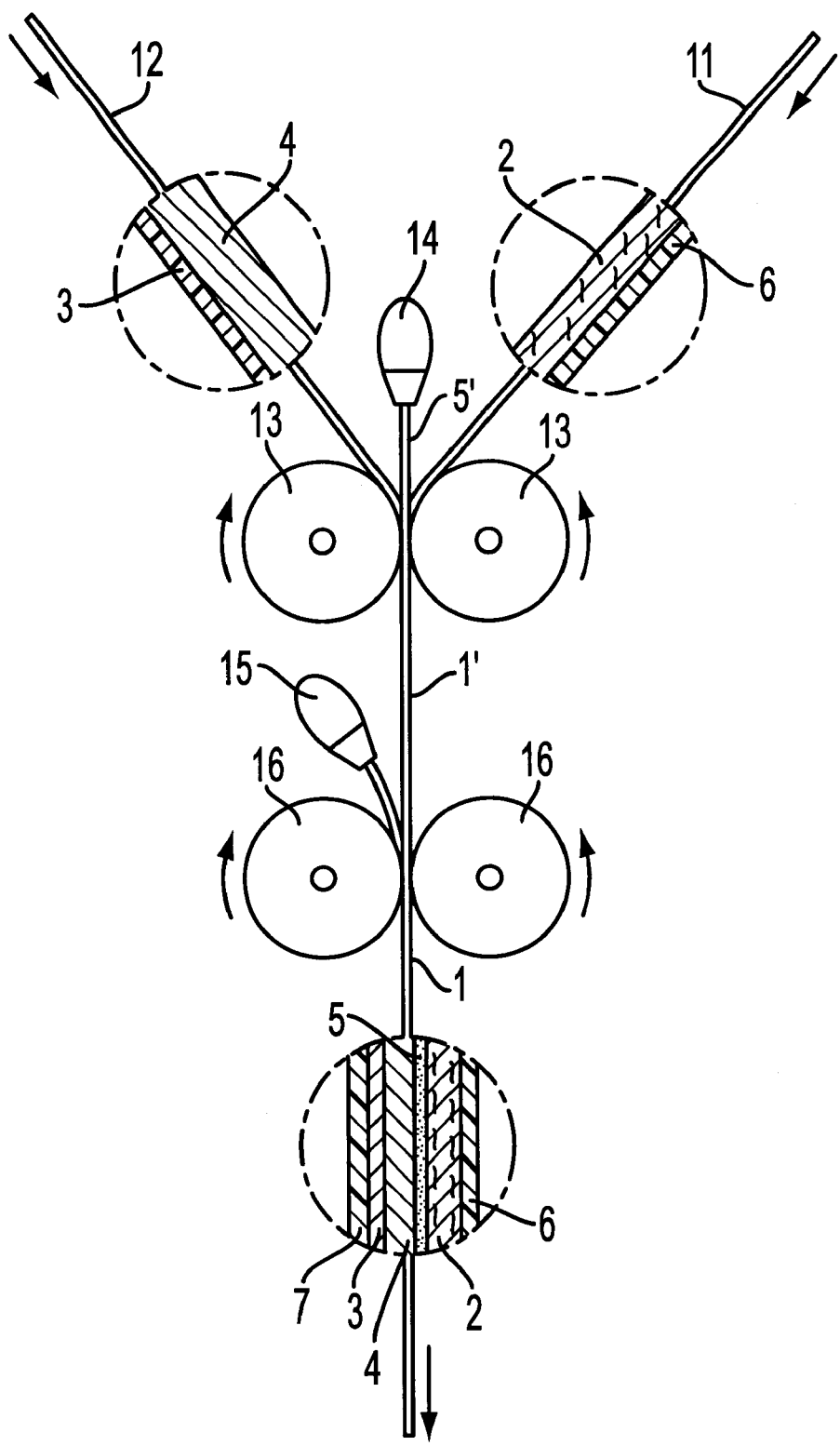

The packing material 1 is manufactured in accordance with FIG. 6 from a first web 11 of prefabricated, laminated material comprising a base layer 2 of paper or cardboard and an outer coating 6 of thermoplastics and a second web 12 of prefabricated, laminated material comprising a polymer carrier 4 which on its one side supports a layer of inorganic material applied by means of vacuum deposition with a layer thickness of 50–500, preferably 200 Å. The two webs 11 and 12 are combined with one another, the base layer 2 of the first web 11 facing towards the polymer carrier 3 of the second web 12, and are made to converge through the nip between a pair of cooperating, counterrotating cylinders 13 at the same time as a layer 5' of bonding agent, e.g. a polyethylene such as BYNEL™, is applied between the webs with the help of an applicator 14 so as to combine the webs lastingly with one another. After passage between the cylinders 13 the side of the laminated weblike material 1' obtained which supports the inorganic material layer 3 is coated with thermoplastics which is extruded from an extruder 15. Thereafter the material 1' is conducted through the nip between a further pair of cooperating counterrotating cylinders 16 with the help of which the thermoplastic coating applied, with cooling, is bonded lastingly to the layer 3 so as to form a finished laminated material 1 in accordance with the embodiment of the invention shown in FIGS. 1 and 2.

To improve adhesion between the extruded thermoplastic coating 7 and the inorganic material layer 3 it may be appropriate in certain cases, prior to the extrusion, to apply an intermediate layer of bonding agent to the free side of the inorganic material layer before the same is coated with thermoplastic material.

Figure 3:
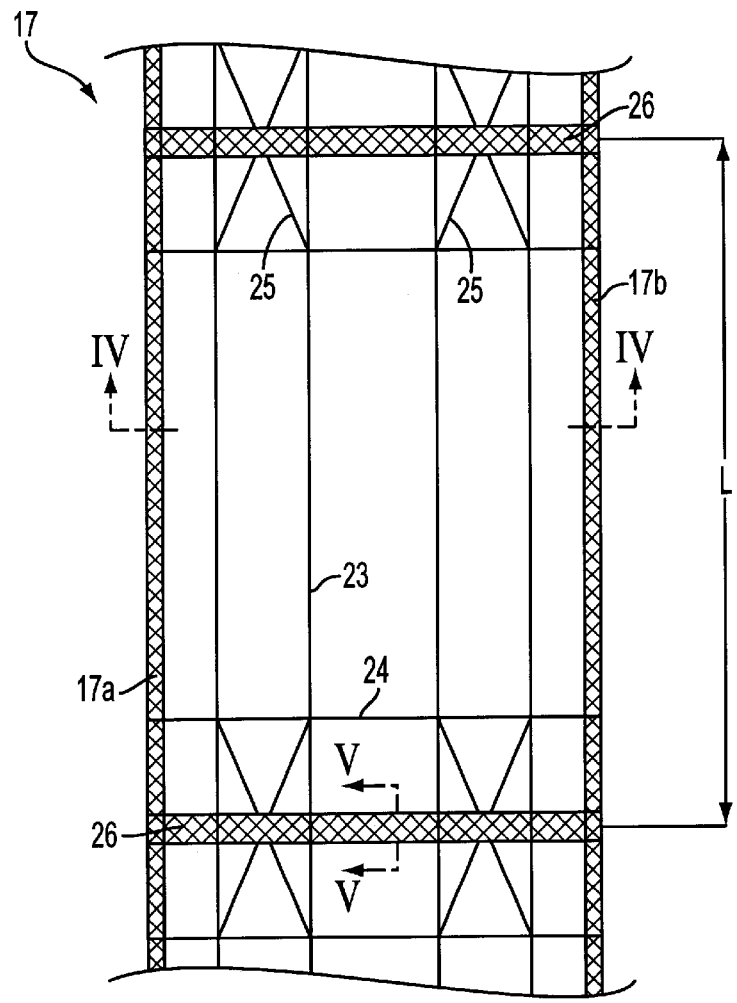
FIG. 3 shows schematically a portion of weblike, laminated material in accordance with a second embodiment of the invention.
Figure 4:
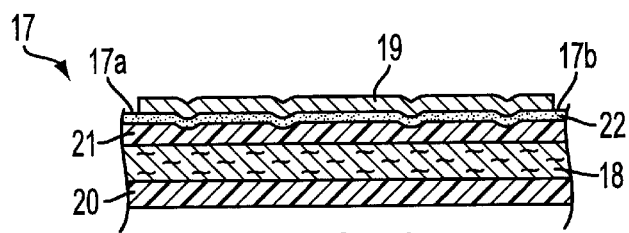
FIG. 4 is a cross-section along the line IV—IV in FIG. 3.
Figure 5:
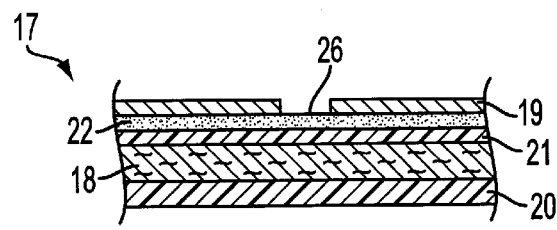
FIG. 5 is a cross-section along the line V—V in FIG. 3, FIG. 6 schematically illustrates a method for he manufacture of the material shown in FIGS. 1 and 2 in accordance with the invention, and FIG. 7 schematically illustrates a method for the manufacture of the material shown in FIGS. 3–5 in accordance with the invention.

FIGS. 3–5 show a portion corresponding to a whole package length L of a laminated material 17 in acordance with a second embodiment of the invention. As in the preceding embodiment, the material 17 comprises a stiffness layer 18 consisting of paper or cardboard which on its one side supports a barrier layer 19 of inorganic material serving as gas and aroma barrier and which on its other side has a coating 20 of thermoplastics. e.g. polythene, extruded onto the base layer. The barrier layer 19 has a material thickness of between 50 and 500, preferably 200 Å and is bonded to the base layer 18 by means of an intermediate coating 21 of thermoplastics, e.g polythene, extruded onto the said one side of the base layer 18. To improve further the adhesion between the barrier layer 19 and the base layer 18 a further layer 22 of bonding agent of the type which possesses good adhesion to the thermoplastic coating 21 as well as the inorganic barrier layer 19, e.g., a polyethylene such as BYNEL™, is provided between the thermoplastic coating 21 and the barrier layer 19.

As with the material in accordance with the preceding embodiment the laminated, weblike material 17 too is provided with a pattern of crease line facilitating the fold-forming of the material which extend parallel with, at right angles to and across the longitudinal direction of the weblike material.

From the material 17 are packing containers with good gas and aroma barrier properties manufactured in that the two longitudinal edge zones 17a and 17b of the web are joined to one another in a longitudinal overlap joint so as to form a tube. The tube is filled with the particular contents and is divided into closed package units by repeated flattening and sealing operations along narrow transverse web regions 26.

Thereafter the packing units are separated from one another by cuts in the transverse sealing zones 26 and are given the desired final geometric shape, usually a parallelepiped, with the help of a further forming and sealing operation during which the double-walled, triangular corner lugs of the cushionlike packing units are folded against, and are sealed to, the outside of the packages. In accordance with the present embodiment, and as distinguished from the preceding embodiment, the barrier layer 19 is freely exposed, i.e. it lacks an outer thermoplastic coating corresponding to the coating 7 of the material 1 described earlier, at the same time as the barrier layer 19 is wholly omitted along such regions of the material 17 which during the manufacture of the packages are intended to be sealed to one another. These regions of the material 17 freed from barrier layer 19 are indicated by a cross marking in FIG. 3 and thus comprise both longitudinal edge zones 17a and 17b of the material and the intended transverse sealing zones 26. In accordance with this embodiment the barrier layer 19 of the material thus will form the inside of the packages in direct contact with the contents of the packages, which is perfectly acceptable, since the barrier layer will consist of a material inert in respect of the contents, preferably silicon dioxide ($SiO_2$) or silicon nitride ($Si_3N_4$).

Figure 7:
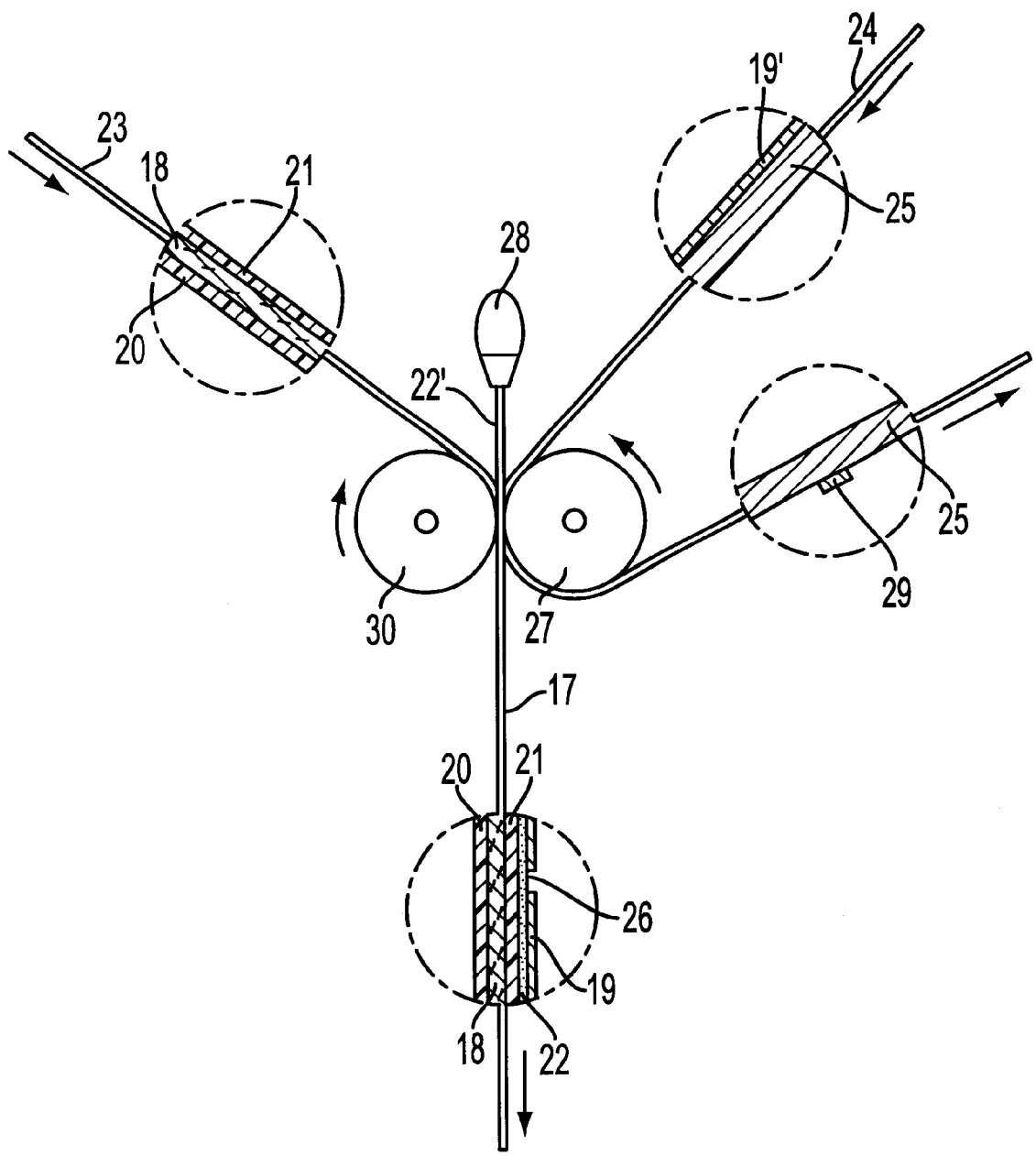

In accordance with FIG. 7 the material 17 is manufactured according to FIGS. 3–5 from a first prefabricated, laminated web 23 comprising a stiffness layer 18 of paper or cardboard and outer coatings 20 and 21 respectively of thermoplastics, e.g. polythene, and a second prefabricated web 24 comprising a polymer carrier 25 which on its one side supports a layer 19' of inorganic material, preferably silicon dioxide ($SiO_2$) or silicon nitride ($Si_3N_4$) applied by means of vacuum deposition. The inorganic material layer 19' possesses a material thickness of between 50 and 500, preferably 200 Å. The two webs 23 and 24 are combined with one another, the thermoplastic coating 21 of the first web 23 facing towards the coated side of the second web 24, and are conducted through the nip between a pair of cooperating counterrotating cylinders 27 and 30 so as to transfer and combine lastingly arbitrary regions of the inorganic material layer 19' with the first web 23. The transfer of certain portions only of the vacuum-deposited film 19' so as to form the pattern indicated in FIG. 3, according to which the two longitudinal edge zones 17a and 17b and the intended transverse sealing regions 26 are completely freed from the inorganic barrier layer 19, is made possible by means of conventional so-called hot stamp technique which in the embodiment chosen here is based on the principle that the cylinder 27 acting upon the second web 24 is provided with a pattern of raised local surface regions and intermediate recessed surface regions corresponding to the pattern according to which the first web 23 is to be coated with inorganic material so as to produce after passage between the cylinders 26 and 27 a finished material 17 in accordance with the embodiment shown in FIGS. 3–5. Owing to the cylinder 27 being designed in this way thus only the parts of the inorganic film 19' which are in contact with the raised surface portions will be transferred to the first web 23, whilst other parts 29 situated in the region of the recessed surface portions freely pass through the nip between the cylinders and remain on the carrier polymer 25 moving away.

Other embodiments of the laminated material include a base layer, comprising, for example, paper or cardboard, and a gas and aroma barrier layer that consists of inorganic material, e.g., a silicon compound such as silicon dioxide or silicon nitride, in a thickness of only 50–500 Å.

What is claimed is:

1. A laminated material for the manufacture of packing containers with gas and aroma barrier properties, comprising a base layer of paper or cardboard having a first side and a second side, a barrier layer serving as a gas and aroma barrier, a carrier layer, the barrier layer consists of silicon dioxide or silicon nitride coating applied by vacuum deposition on said carrier layer, said barrier layer having a thickness of between 50 and 200 Å, and means for adhering said carrier layer to said first side of the base layer, said barrier layer being exposed directly to the interior of a packing container that has been formed from the laminated material.

2. A laminated material in accordance with claim 1, wherein the carrier layer is formed of a polyester and is bonded to the base layer by means of an intermediate layer of bonding agent.

3. A laminated material in accordance with claim 1 wherein the barrier layer is covered by a sealing layer.

4. A laminated material in accordance with claim 3 wherein the sealing layer is a thermoplastic material.

5. A laminated material in accordance with claim 4 wherein the thermoplastic material is polyethylene.

6. A laminated material according to claim 1 wherein the second side of the base layer is covered by a sealing layer.

7. A laminated material in accordance with claim 6 wherein the sealing layer is polythene.

8. A laminated material for the manufacture of packing containers with gas and aroma barrier properties, comprising:

a base layer of paper or cardboard having a first side coated with a first thermoplastic layer and a second side coated with a second thermoplastic layer;

and a barrier layer serving as a gas and aroma barrier supported on the first thermoplastic layer, wherein the barrier layer consists of silicon dioxide or silicon nitride formed by vacuum deposition in a thickness of between 50 Å and 200 Å, which is deposited on a polyester carrier, said carrier being bonded to the first thermoplastic layer by means of an intermediate layer of bonding agent.

9. A laminated material in accordance with claim 8 wherein the barrier layer is applied to the base layer by means of a hot stamp technique and is bonded to the base layer by means of an intermediate sealing layer.

10. A laminated material in accordance with claim 8 wherein the barrier layer is omitted along the regions which are intended to be facing against, and be sealed to, one another during manufacture of the said container.

11. A laminated material in accordance with claim 1 wherein the laminated material is provided with an arbitrary pattern of crease lines which run parallel with, perpendicularly to and across a longitudinal direction of the material.

12. A laminated material for the manufacture of packing containers with gas and aroma barrier properties, consisting essentially of:

a base layer of paper or cardboard having a first side and a second side;

a polyester carrier layer having a first side and a second side, wherein the first side of the polyester carrier layer is bonded to the first side of said base layer; and a barrier layer of silicon dioxide or silicon nitride serving as a gas and aroma barrier applied to the second side of said polyester carrier layer by vacuum deposition, the barrier layer having a thickness of between 50 and 200 Å.

13. A laminated material in accordance with claim 12 wherein the polymer carrier is polyester.

14. A laminated material in accordance with claim 12 wherein the second side of the base layer is covered with polythene.

15. A laminated material for the manufacture of packing containers consisting essentially of:

a base layer of paper or cardboard;

a barrier layer containing a silicon dioxide coating on a polyester carrier layer; and means for binding the carrier layer to the base layer to form a laminated material, the silicon dioxide coating having a thickness of between 50 and 200 Å.

16. A laminated material in accordance with claim 15 wherein the means for binding the barrier layer to the base layer is a thermoplastic material.

17. A laminated material in accordance with claim 16 wherein the thermoplastic material is polythene.

18. A laminated material in accordance with claim 15 wherein the laminated material has crease lines in the barrier layer.

19. A laminated material for the manufacture of packing containers with gas and aroma barrier properties, comprising:

a base layer of paper or cardboard having a first side and a second side;

a polyester carrier layer having a first side and a second side, the first side of the polyester carrier layer being bonded to the first side of said base layer by an intermediate bonding agent;

a barrier coating of silicon dioxide or silicon nitride serving as a gas and aroma barrier applied to the second side of said polyester carrier layer by vacuum deposition, said barrier coating having a thickness of between 50 Å and 200 Å;

a first thermoplastic sealing layer covering the second side of said base layer; and said barrier coating being exposed and without a thermoplastic sealing layer covering said barrier coating.

20. A laminated material in accordance with claim 19 wherein the thermoplastic sealing layers are polythene.

21. A laminated material in accordance with claim 19 wherein the laminated material is provided with an arbitrary pattern of crease lines which run parallel with, perpendicularly to and across a longitudinal direction of the material.

22. A laminated material in accordance with claim 19, wherein said barrier layer has reduced susceptibility to cracking when the laminate is subsequently formed into a packing container.

23. A laminated material in accordance with claim 19, wherein said barrier layer has reduced susceptibility to cracking when the laminate is subsequently formed into a packing container.

24. A laminated material in accordance with claim 1, wherein said barrier layer has reduced susceptibility to cracking when the laminate is subsequently formed into a packing container.

25. A laminated material in accordance with claim 12, wherein said barrier layer has reduced susceptibility to cracking when the laminate is subsequently formed into a packing container.

26. A laminated material in accordance with claim 15, wherein said barrier layer has reduced susceptibility to cracking when the laminate is subsequently formed into a packing container.

* * * * *